Sept. 17, 1968   M. J. FRANCIS   3,401,743

AUTOMOBILE COOLING SHROUD

Filed Nov. 18, 1966

INVENTOR.

*Mike J. Francis*

United States Patent Office 3,401,743
Patented Sept. 17, 1968

3,401,743
AUTOMOBILE COOLING SHROUD
Mike J. Francis, 606 Tapawingo Road,
Vienna, Va. 22180
Filed Nov. 18, 1966, Ser. No. 595,402
1 Claim. (Cl. 165—51)

ABSTRACT OF THE DISCLOSURE

A circular enclosure around an automobile cooling fan, the enclosure serving to direct air blown by the fan toward the engine, the enclosure being comprised of a tubular coil that is connected in parallel with an automobile heater to the cooling system for allowing water to circulate therethrough, the tubular coil thus performing the function of an auxiliary cooling unit.

---

This invention relates to cooling devices, and more particularly an automobile cooling shroud.

It is therefore the main purpose of this invention to provide an automobile cooling shroud which is particularly adapted to be used with automobiles having air conditioning systems therein.

Another object of this invention is to provide an automobile cooling shroud which is designed to direct air around the engine and at the same time to add additional water thereto and prevent pressure overflow of water in the radiator.

Another object of this invention is to provide an automobile cooling shroud which may be fitted over the fan blades of an automobile and against the radiator of virtually any make or model.

Still another object of this invention is to provide an automobile cooling shroud which is easy to install, relatively inexpensive to manufacture, may be sold at reasonable cost, is of rugged yet simple construction, virtually presents no maintenance problem and provides maximum utility to the motorist driving an air conditioned vehicle.

Other objects and advantages of this invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claim.

Figure 1:
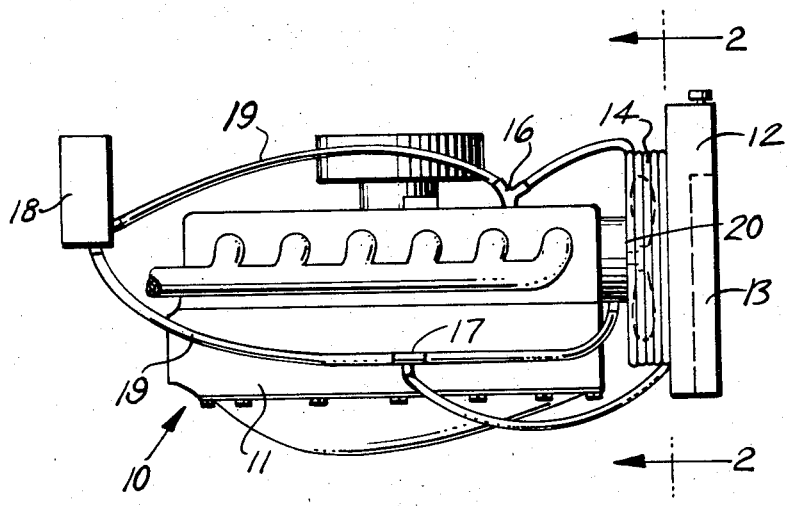
FIGURE 1 is a side view of this invention.
Figure 2:
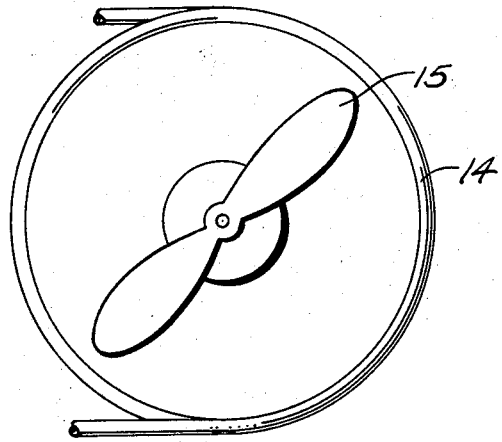
FIGURE 2 is a cross-sectional view taken along the lines 2—2 of FIGURE 1.

According to this invention, an automobile cooling shroud 10 is generally used with a standard power plant arrangement having an engine block 11, a conventional radiator 12 which, in turn, includes an evaporator 13. A cooling shroud consisting of circular copper tubing, preferably made of soft drawn copper material is fitted around the blades of fan 15 and is secured to the rear side of radiator 12. Y-type fitting or coupling is secured to the top portion of engine block 11 for supporting tubing 19 which extends from the top portion of shroud 14 and terminates at the heater system 18. A T-type fitting or coupling 17 is attached to one side of block 11 and connects heater system 18, pump 20, and radiator 12 to each other.

It should be noted that, in operation, water generally circulates the coiling arrangement of shroud 14 without obstruction of heater system 18. Shroud 14 therefore directs the flow of air around the engine block 11 and at the same time adds additional water to the engine and prevents the overflow of water in the radiator 12.

While the particular automobile cooling shroud herein shown and described in detail is fully capable of attaining the objects and providing the advantages herein above stated, it is to be understood that it is merely illustrative of the presently preferred embodiment of this invention and that no limitations are intended to the details of construction or design herein shown other than as defined in the appended claim.

What I now claim is:

1. An automobile cooling shroud for use in an air-conditioned automobile, comprising in combination, a cylindrical enclosure placed around a cooling fan for an automobile engine, said enclosure comprising a cylindrically configurated coil formed from tubular material, said coil being positioned adjacent a rear side of an automobile radiator, the opposite ends comprising tubular ends being secured in parallel circuits with the automobile heater to a cooling system of the automobile, one of said tubular ends being connected to a Y fitting carrying coolant liquid between an engine block and said heater, the other of said tubular ends being connected to a T fitting carrying liquid coolant between said heater and a water pump, said tubular coil comprising a means for directing the air blown by said fan towards said engine, and said tubular coil comprising a means for an auxiliary cooler for said liquid coolant circulating through the cooling system of said automobile.

References Cited

UNITED STATES PATENTS 3,251,409    5/1966    Herbert _____ 165—125
3,315,731    4/1967    Jensen et al. _____ 165—51

ROBERT A. O'LEARY, *Primary Examiner.*

C. SUKALO, *Assistant Examiner.*